P. V. HUNTER.
DISTRIBUTION OF ELECTRICAL ENERGY.
APPLICATION FILED JUNE 21, 1912.
1,104,733.
Patented July 21, 1914.
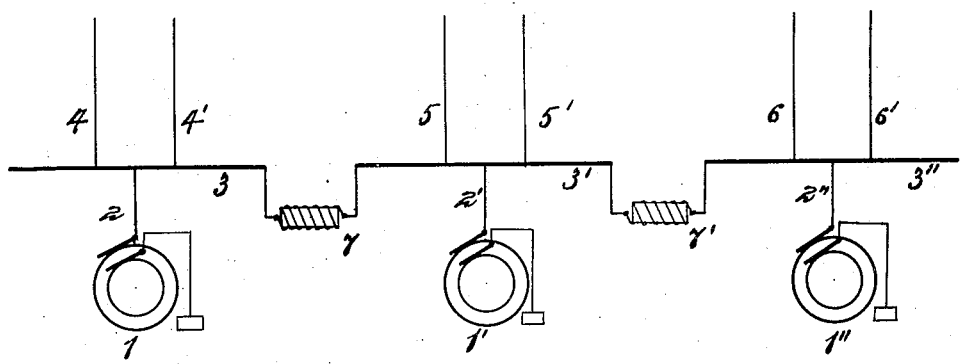
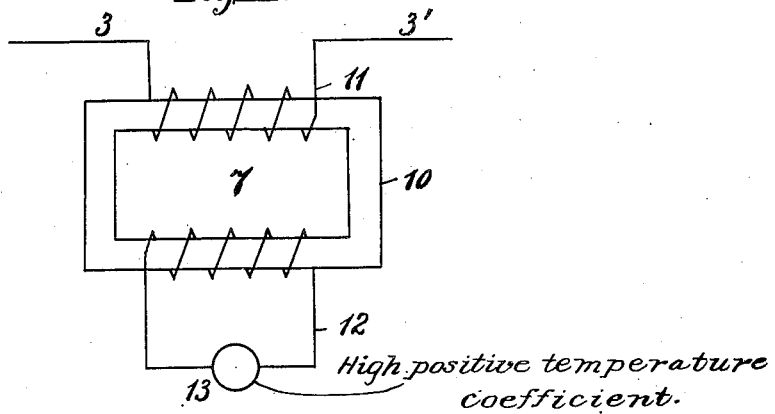
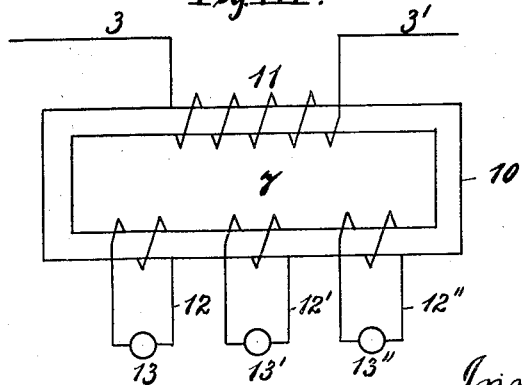

UNITED STATES PATENT OFFICE.

PHILIP VASSAR HUNTER, OF HEATON, NEWCASTLE-UPON-TYNE, ENGLAND.

DISTRIBUTION OF ELECTRICAL ENERGY.

1,104,733.  Specification of Letters Patent.  Patented July 21, 1914.

Application filed June 21, 1912. Serial No. 704,996.

*To all whom it may concern:*

Be it known that I, PHILIP VASSAR HUNTER, residing at 41 Coquet Terrace, Heaton, Newcastle-upon-Tyne, in the county of Northumberland, England, have invented new and useful Improvements in or Connected with the Distribution of Electrical Energy, of which the following is a specification.

In large electrical power supply stations in which a number of powerful generators are at work a known practice is to connect the bus bars, into which the generators are feeding, through choking coils for the purpose of preventing any great and sudden rush of current from one to another of the said bus bars on a breakdown or bad leak occurring in the mains. The said choking coils are so selected or constructed as to offer great impedance to short circuits thus limiting the amount of current which can be transmitted through a short circuit. With such choking coils there is an appreciable impedance when the generators are exchanging current across the choking coils under ordinary working conditions, which is undesirable.

In the drawings Figure I is a diagram of the present system of central station apparatus using bus bars; Fig. II is a diagram of my improvement of an element of this system and Fig. III is a diagram of a modification of this element in accordance with my invention.

Fig. I of the accompanying drawings shows the manner in which such choking coils are usually employed. In the said figure, 1, 1', 1'' are generators, 2, 2', 2'', are leads connecting these generators with bus bars 3, 3', 3'', and 4, 4', 5, 5', 6, 6', are mains running from the said bus bars. Arranged between the bus bars are the choking coils 7, 7'. When desired choking coils are sometimes placed in the leads 2, 2', 2'', and also at other parts of the system.

In carrying my invention into effect instead of employing choking coils as ordinarily constructed and as described above, I employ a new type of choking device which I have invented, and so avoid the drawback referred to above. This new type of choking device embraces a material whose resistance increases with increase of current (hereinafter for the purposes of this specification termed a "resistance" with a high positive temperature coefficient) such for example as a conductor of osram. A convenient form of such resistance consists of an osram lamp or a bank of osram lamps and a way in which I contemplate using such is as follows. I place transformers between the bus bars (or, when desired, in other parts of the system as in the case of ordinary choking coils). In the circuit of the secondary windings of these transformers I place resistances having a high positive temperature coefficient. By this means a much better choking effect is obtained.

My invention is diagrammatically illustrated in Figs. II and III.

Referring to Fig. II, it will be seen that my choking device consists in this case of the combination of a resistance with a high positive temperature coefficient and a transformer. 10 is the magnetic circuit of the transformer and 11 is the primary winding thereof placed in series between the bus bars 3 and 3'. 12 is the secondary winding and in this is placed the resistance 13 having a high positive temperature coefficient.

Fig. III differs from Fig. II in that my choking device consists of the combination of three resistances having a high positive temperature coefficient and a single transformer having three secondary windings. 10 is the magnetic circuit, 11 the primary winding, 3, 3' bus bars, all arranged as in Fig. II. There are three secondary windings 12, 12', 12'' each embracing a separate resistance 13, 13', 13''.

I desire it to be understood that I do not limit myself to any particular material with which to construct the resistance of my choking device. I however find that a conductor of osram is convenient.

I may so construct or arrange my resistances having a high positive temperature coefficient as to present reactance as well as resistance in which case I may dispense with the transformers and use my resistance as a mere choke coil having both reactance and resistance.

In operation, it will be seen that during short circuits the resistance 13 in my secondary circuit will be high and the reactance in the primary circuit correspondingly great, as is desired. Under normal conditions, the secondary resistance being low, the reactance of the primary is correspondingly low.

Having thus described my invention, what I claim as new and desire to secure by Letters Patent is:

1. An electrical distribution system comprising generators, bus-bars in series connected thereto, and a reactance between adjacent bus bars having a high positive temperature coefficient substantially as described.

2. An electrical distribution system comprising generators, bus-bars in series connected therewith, a transformer having its primary in series between two bus-bars and a resistance with a high positive temperature coefficient in the secondary circuit substantially as described.

3. An electrical distribution system comprising generators, bus-bars in series connected therewith, a transformer having its primary in series between two bus-bars and a multiplicity of secondaries each with a resistance having a high positive temperature coefficient in its secondary substantially as described.

In witness whereof I have signed my name to this specification in the presence of two subscribing witnesses.

PHILIP VASSAR HUNTER.

Witnesses:
H. NIXON,
FRED H. DUKE.